Figure 1:
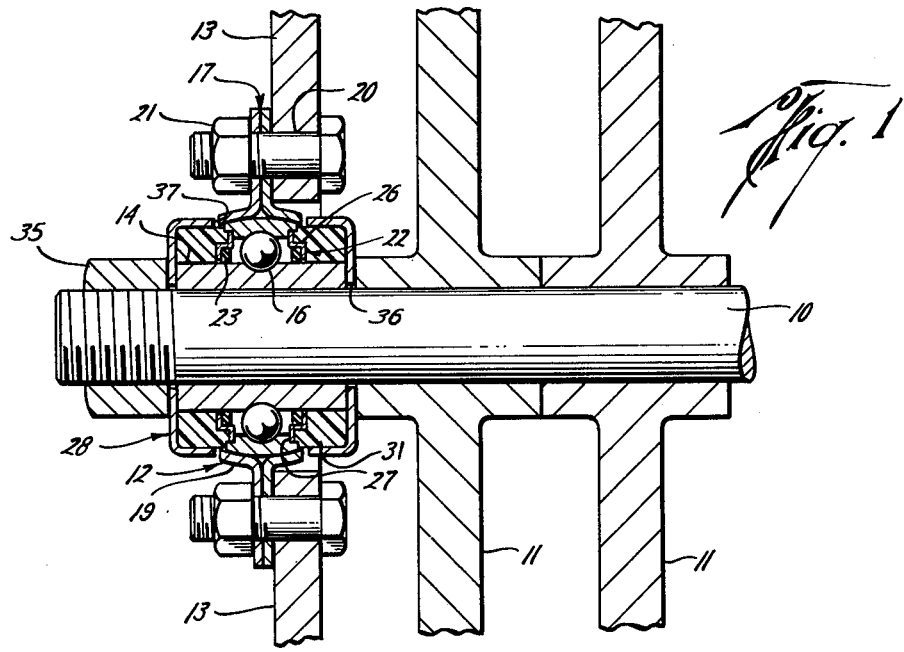

July 21, 1964

C. L. LEHMAN 3,141,710

SHAFT ROLLER BEARING SEAL

Filed Sept. 14, 1961

Charles L. Lehman
INVENTOR.

BY
ATTORNEYS

United States Patent Office 3,141,710
Patented July 21, 1964

3,141,710
SHAFT ROLLER BEARING SEAL
Charles L. Lehman, Rte. 3, Box 53, Corpus Christi, Tex.
Filed Sept. 14, 1961, Ser. No. 138,145
2 Claims. (Cl. 308—187.1)

This invention relates to an improved seal for a shaft roller bearing. In one of its aspects, it relates to a seal which is especially well suited as an accessory for an existing roller bearing seal of conventional design.

The problem of maintaining a proper seal about the moving parts of a roller bearing is acute in the case of farm equipment which is exposed to extreme weather conditions, particularly when such bearings are used about shafts close to and otherwise unprotected from the ground. For example, I have found that small particles of dust will find their way past conventional seals and between the rollers and races. At the same time, this sort of bearing must permit a reasonable amount of flexibility between its support and the shaft it surrounds. This is especially true in the case of bearings for shafts upon which earth working elements of farm implements are mounted.

It is therefore an object of this invention to provide a bearing of this type having a seal which will better protect the moving parts of the bearing from such particles.

It is a more particular object to provide such a seal which may be used as an accessory for an existing bearing seal.

Another object is to provide such a bearing, or an accessory seal therefor, which permits a certain amount of flexibility of the shaft with respect to parts from which the bearing is supported.

A further object is to provide such a seal which is of simple and inexpensive construction and which may be asembled as an accessory about a conventional bearing with relative ease.

Other objects, advantages and features of this invention will become apparent to one skilled in the art upon consideration of the written specification, the attached claims and the anexed drawings.

Figure 2:
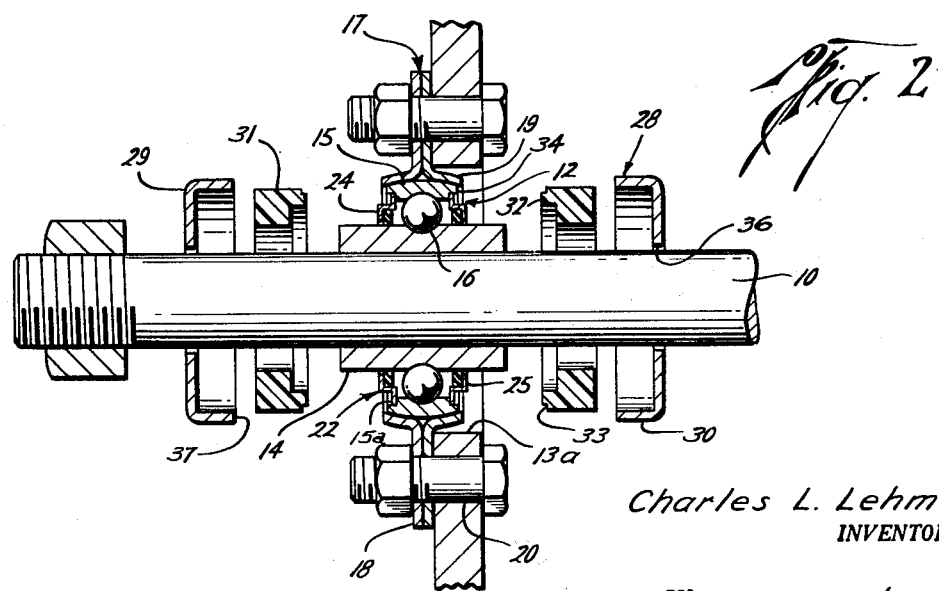

In the drawings, wherein like reference characters are used throughout to designate like parts:

FIG. 1 is a cross-sectional view of a roller bearing having a seal constructed in accordance with the present invention and disposed in operative position about a shaft; and FIG. 2 is a cross-sectional view similar to FIG. 1, but showing parts of the seal separated from the bearing and from one another.

With reference now to the details of the above-described drawings, and particularly to FIG. 1, a shaft 10 supports a plurality of members 11 for rotation therewith about a horizontal axis. These members may comprise, for example, rotary earth working elements such as hoes for a cultivator of the type shown in Patent No. 2,994,387. The shaft is supported for such rotation by means of one or more roller bearings 12 which are, in turn, carried from parts 13 fixed against rotation with the shaft. When the members 11 are rotary hoes or other rotatable cultivating elements, the parts 13 may comprise portions of a frame adapted to be moved forwardly over the ground which is engaged by the cultivating elements.

As shown in FIGS. 1 and 2, the bearing 12 is of more or less conventional construction, including an inner annular race 14 fixed about the shaft, an outer race 15 spaced radially outwardly from the inner race, and a plurality of rollers, such as the balls 16, slidable between the inner and outer races.

The bearing is at least partially carried within an opening 13a of frame part 13 by means of a clamp 17 which includes complementary discs 18 having flanged rims 19 curved to fit the concave outer side of the outer race. Bolts 20 extend through aligned recesses in the discs as well as through an opening in the part 13 so that threading of the nuts 21 onto the ends of the bolts not only assembles the clamp about the bearing, but also carries or supports said bearing from the part 13 fixed against rotation with the shaft 10. The interengaging curved surfaces of outer race 15 and disc rims 19 are essentially spherical to permit the aforementioned flexibility.

As can be seen from FIGS. 1 and 2, the inner race 14 extends axially beyond both opposite ends of the outer race 15 and is surrounded by an annular seal 22 which closes the space between the inner and outer race on each opposite side of the rollers 16. Each annular seal includes a ring 23 of suitable sealing material, such as rubber or the like, slidably surrounding the inner race 14 and a retainer 24 of metal or other rigid material having a radially extending inner flange 25 adjacent the outer side of the seal ring 23 and an axially extending flange 26 bearing upon the outer circumference of the ring. An outer radially extending flange 27 of the retainer 24 is held against an annular groove 15a on the inner side of the outer race 15 to complete the closure. As previously mentioned, however, dust and other fine smaller particles find their way past the annular seal 22 into the space between the inner and outer races.

In order to provide a better seal for the rollers 16 and thereby greatly lessen the likelihood of fouling of the bearing parts, I provide a seal 28 which, as previously mentioned, may comprise a part of an over-all shaft bearing assembly or, in the alternative, an accessory for an existing shaft bearing, such as the one above described. Each seal 28 comprises a cup 29 having a flange 30 extending inwardly toward the bearing 12, and a ring 31 of suitable sealing material confined within the flange 30 of the cup to seal against the bearing radially outwardly of the space betwen the inner and outer races thereof.

The sealing ring 31 has a rim 32 extending inwardly from its inner end for engagement, in the assembled position of the seal 28, with the retainer 26 as well as with the end of the outer race 15. There is a notch 33 in the seal ring 31 and about the rim 32 which fits closely over the corner 34 surrounding the groove 15a in the end of the outer race. As best shown in FIG. 1, this permits the rim 32 to fit tightly within a correspondingly shaped channel formed by the outer race and the retainer 26.

Although the seal ring 31 fits closely over the end of the inner race 14 which projects axially beyond the end of the outer race 15, this is not intended to provide the main seal, which instead results from the previously described engagement of the seal ring 31 with the parts of the bearing 12 radially outwardly of the space between the inner and outer races. The notch 33 and corner 34 not only facilitate the tight fit of the rim within the channel in the end face of the bearing, but also in effect provide a labyrinth type seal between such space and the exterior of the bearing.

The inner end of seal ring 31 is held tightly against the bearing by the cup 29 which is, in turn, forced axially toward the bearing by either a member 11 on the shaft or a nut 35. Thus, the members 11 may be assembled on the shaft over the left end thereof and located adjacent a stop (not shown), such as another bearing. The bearing 12 as well as the seals 28 on both ends thereof may then be assembled onto the free end of the shaft 10 and held against the leftmost member 11 as the nut 35 is threaded onto the end of the shaft. Obviously, the nut may be threaded onto the shaft to force the sealing rings against the bearing with the desired degree of force. Alternatively, the nut 35 shown in FIGS. 1 and 2 may first be made up on the shaft 10, and the seals 28 and bearing 12 and the members 11 then moved over the shaft from the right end thereof for location against the nut 35.

Each cup 29 has an opening 36 therethrough to pass over the shaft 10 in slightly spaced relation thereto. As shown in FIG. 1, the opening 36 is disposed radially inwardly of the inner diameter of seal ring 31 so that when the cup is forced axially toward the bearing, as previously described, an inwardly facing annular surface on the cup surrounding such openings will abut the end of the inner race 14. Also, the inner end 37 of each flange 30 on the cup 29 is spaced slightly outwardly from the flanges 19 of the clamp 17 when one seal 28 is fully made up with respect to the bearing. These spaces enable the shaft 10 to have a certain amount of flexibility with respect to the part 13, which flexibility is especially desirable in the case of equipment having members 11 supported from the shaft for engaging the ground, as in the case of the cultivator previously described. That is, such members frequently engage rocks or other rigid obstructions in the ground which might otherwise cause the bearing seal to bind on the shaft.

From the foregoing, it will be seen that this invention is one well adapted to attain all of the ends and objects hereinabove set forth, together with other advantages which are obvious and which are inherent to the apparatus and structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. In combination with a bearing comprising rollers disposed in a space between an inner race surrounding a shaft for rotation therewith and an outer race carried by a part fixed against rotation with the shaft; a seal comprising a cup having an opening therein receiving the shaft and an annular flange extending inwardly toward the bearing assembly, and a ring of resilient sealing material carried within the cup flange surrounding the inner race and sealing at its inner end against the outer race, the inner edge of the cup flange being spaced from the outer race to permit a certain amount of flexibility between the shaft and part fixed against rotaiton therewith.

2. A shaft bearing and seal combination, comprising an inner race, an outer race spaced radially outwardly from the inner race, rollers disposed in the space between the inner and outer races, an annular seal closing one end of the space between the races, a cup having an opening therethrough axially aligned with the inner race and a flange extending inwardly toward the bearing seal, and a ring of resilient sealing material confined within the cup flange and having an opening therethrough surrounding the inner race and sealing at its inner end against the outer race, the iwardly facing surface on the cup surrounding the opening therein abutting with the end of the inner race and the inner end of the cup flange being spaced from the end of the outer race.

References Cited in the file of this patent
UNITED STATES PATENTS

| | | |
|---|---|---|
| 2,712,966 | Brady et al. | July 12, 1955 |
| 2,733,648 | Todd | Feb. 7, 1956 |
| 2,866,670 | Harris et al. | Dec. 30, 1958 |
| 2,982,999 | Stewart | May 9, 1961 |
| 3,014,768 | Dickinson | Dec. 26, 1961 |